(12) United States Patent
Drew et al.

(10) Patent No.: US 6,254,979 B1
(45) Date of Patent: Jul. 3, 2001

(54) LOW FRICTION ELECTRICAL TERMINALS

(75) Inventors: George Albert Drew, Warren, OH (US); Mark S. Ricketts, Windsor (CA); Bryan A. Gillispie, Warren; Yang-Tse Cheng, Rochester Hills, both of MI (US); Robert A. Suchanek, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/089,630

(22) Filed: Jun. 3, 1998

(51) Int. Cl.[7] .............................. B32B 5/16; B32B 15/08; H01H 1/02; C25D 15/00; B05D 1/18

(52) U.S. Cl. .......................... 428/323; 428/327; 428/328; 428/332; 428/339; 428/341; 428/546; 428/626; 428/929; 205/109; 205/154; 205/194; 205/196; 205/220; 427/58; 427/430.1; 427/435; 427/405; 427/409

(58) Field of Search ..................................... 428/323, 327, 428/328, 332, 334, 338, 339, 546, 570, 614, 621, 624, 626, 929, 341; 427/58, 61, 63, 71, 101, 102, 103, 117, 118, 123, 125, 430.1, 434.3, 434.5, 435, 443.1, 384, 405, 409; 205/109, 158, 220, 194, 196

(56) References Cited

U.S. PATENT DOCUMENTS

| 3,494,998 | * | 2/1970 | Anhalt | 264/249 |
| 4,600,480 | * | 7/1986 | Coombes et al. | 204/20 |
| 5,028,492 |   | 7/1991 | Guenin | 428/614 |
| 5,141,702 |   | 8/1992 | Guenin et al. | 419/8 |
| 5,235,743 |   | 8/1993 | Endo et al. | 29/685 |
| 5,477,661 | * | 12/1995 | Gay | 419/36 |

FOREIGN PATENT DOCUMENTS 57-152499A * 9/1982 (JP).

* cited by examiner

*Primary Examiner*—Paul Thibodeau
*Assistant Examiner*—Holly Rickman
(74) *Attorney, Agent, or Firm*—Richard A. Jones (57) ABSTRACT

A low friction, low contact resistance coating for electrical terminal members, especially members made of copper base alloys and low carbon steel alloys and plastics, is formed of a coarse electroplate of tin or silver characterized by grains having an average dimension in the range of about 0.5 to 10 micrometers where such grains carry very small particles of polytetrafluoroethylene or the like having average diameters in the range up to about 0.30 micrometers.

11 Claims, 7 Drawing Sheets

LOW FRICTION ELECTRICAL TERMINALS

TECHNICAL FIELD

This invention pertains to electrical connectors that provide oxidation resistance and low contact electrical resistance in combination with reduced engage/disengage force requirements.

BACKGROUND OF THE INVENTION

The electrical content of automobiles and other useful articles of manufacture is continually increasing, leading to a corresponding increase in the demand for reliable electrical connectors. In the case of automobile connectors many applications require multi-terminal male/female type connectors. Multi-terminal connectors require appreciable force to engage and disengage the connection and it is, of course, important that such connectors be fully and properly engaged.

Many electrical terminals are made of copper alloys that provide good strength and bulk electrical conductivity properties. However, copper alloy terminals oxidize in air, and the resulting oxidized coatings increase the electrical resistance of the connection. Accordingly, it is a common practice to provide a tin, silver or gold coating to the surface of such copper alloy terminals. These metals provide low electrical contact resistance and oxidation protection to the copper alloy terminal, but tin and silver in particular do not have low coefficients of friction and tend to increase the force required to engage and disengage the connectors. While gold has a relatively low coefficient of friction, it is too expensive for many connector applications.

It would be particularly useful to have a tin or silver coating layer for such copper-based connectors that would retain the low contact resistance of the base metal and yet display a lower coefficient of friction for engaging the terminal pieces. There have been suggestions to incorporate low friction polymer particles such as polyimide, polyamide and polytetrafluoroethylene particles with tin or lead particles to form a mixture that can be applied in suitable fashion to the surface of a copper base terminal alloy stock material. These practices are described, for instance, in Guenin, U.S. Pat. No. 5,028,492, "Composite Coating for Electrical Connectors"; Guenin et al, U.S. 5,141,702, "Method of Making Coated Electrical Connectors"; and Endo et al, U.S. Pat. No. 5,235,743, "Method of Manufacturing a Pair of Terminals Having a Low Friction Material on a Mating Surface to Facilitate Connection of the Terminals". The preparation of tin, tin alloy or lead alloy particulate mixtures with particles of a suitable polymer requires separate processing operations. Further operations are required to form a cladable layer of the mixture and adhere the cladding material to the copper base terminal alloy. In one embodiment of the Guenin disclosures, it is proposed to co-deposit polymer particles with tin from a tin sulfate electroplating bath so as to provide an electro-deposited tin layer entraining particles of polyimide, polyamide or polytetrafluoroethylene. In these Guenin disclosures, the thickness of the tin matrix with the polymer dispersion is of the order of about one to about three microns, and the diameter of the polymer particles is from about 0.5 to about 3 microns.

As stated, these co-deposition and/or cladding operations are cumbersome and add to the cost of the terminal manufacture. It would be preferable to have a practice that enables a copper alloy terminal stock or a copper alloy terminal to be simply electroplated with tin in a suitable form and a suitable lubricating material applied to the tin that does not reduce the conductivity of the terminal.

SUMMARY OF THE INVENTION

This invention provides electrical conductors based on a core material of suitable bulk conductivity and having a surface layer of tin or, optionally, silver electrodeposited in a suitably coarse grain form so as to accommodate a deposition of very small particles of polytetrafluoroethylene or other suitable low friction insulating polymer particles on and between the grains. The invention involves electroplating a layer of tin or of silver on the base metal surface so that a suitable coarse, grainy electrodeposited layer is formed which is characterized by grains having average dimensions in the range of about 0.5 to 10 micrometers. Preferably, the grain size is about 2 to 5 micrometers in the view provided by a Scanning Electron Micrograph, e.g. A coarse grained electroplated surface of this nature is preferred because it accommodates the deposition of very small particles (for example, micro-sized particles) of polytetrafluoroethylene (PTFE) or other suitable particles having an average dimension in the range of about 0.2 to 0.4 microns. These very small particles of PTFE or the like when applied in a suitable quantity provide individual lubricating particles on and between the grains of the electroplated layer. Under the load applied to the electroplated layer during engagement or disengagement of electrical connectors, the PTFE particles provide sufficient lubricity to accommodate the connect or disconnect step. On the other hand, once the terminals have been brought into full contact, the number of PTFE particles is such that the contact resistance between the engaged terminal pieces is not so high as to adversely affect the electro-connection.

In accordance with the practice of this invention, the electroplated tin or silver matte coating may be applied to the base stock such as a copper alloy from which the terminals or connectors are formed. Alternatively, the terminals can be formed from a suitable alloy, and the electroplating and/or the polymer particle coating accomplished on the shaped terminal piece. Preferably, the quantity of PTFE microparticles that are deposited on the electroplated tin or silver coating is controlled such that the contact resistance of the member with an engaging terminal piece is no greater than about 5 milliohms at the design contact load. In general, a suitable areal density (based on geometric surface area, not actual surface area of the matte plate) of the PTFE particles is in the range of 0.02 gram/m$^2$ to 0.4 gram/m$_2$.

Other advantages and forms of the invention will become more apparent from a detailed description thereof which follows. Reference will be had to the drawings in which:

DESCRIPTION OF PREFERRED EMBODIMENTS

The number of electrical terminals and connectors in automobiles and in other applications is growing. A very large volume of such connectors is formed of suitable copper base alloys which are electroplated with tin. The tin plate is required to ensure reliable electrical contacts in air and other oxidizing environments. While the electroplated tin can satisfy many requirements for the terminals such as low electrical contact resistance and reasonably good fretting wear resistance, the friction coefficient of connectors electroplated with tin is usually quite high—0.8 to 1. A large frictional force can cause difficulty during assembly and service of multi-terminal electrical connectors in automobile environments. In the lifetime of an automobile, these connectors may be expected to be disassembled and reassembled several times. Many of the connectors are located in hard to reach or confined locations. Therefore, a durable, low friction, low electrical resistance coating is desirable for automotive electrical connectors and electrical connectors for other applications.

Polytetrafluoroethylene (PTFE) is, of course, a well-known solid lubricant. It is also an excellent electrical insulator. Thus, when its usage has been sought in electrical connectors, it has been mixed with tin or other metal to limit the polymer content and thereby use some of its lubricity without increasing the electrical resistance of an intended electrical connection. However, as described above, the practices of mixing PTFE particles with tin or other metal particles or co-depositing tin with PTFE particles is a cumbersome and relatively expensive operation for use in the manufacture of what are required to be inexpensive electrical terminals.

This invention overcomes the shortcomings of the prior art practices of using tin-lubricating polymer particle mixtures on electrical terminals by employing available tin or silver plating processes in a way that provides a coarse grained surface finish that is often undesired in electroplating operations. Following the formation of such a matte or coarse electroplated finish very small PTFE particles in aqueous suspension are deposited on the rough surface. The size of the particles, nominally 0.2 to 0.3 microns in average diameter, is smaller than the grain size of the electroplated surface. Therefore, the PTFE particles lie on and between the grains of electroplated material so as to perform lubricating function during the making or breaking of the electrical connection without markedly increasing the contact resistance of the formed connection.

Figures 1A, 1B:
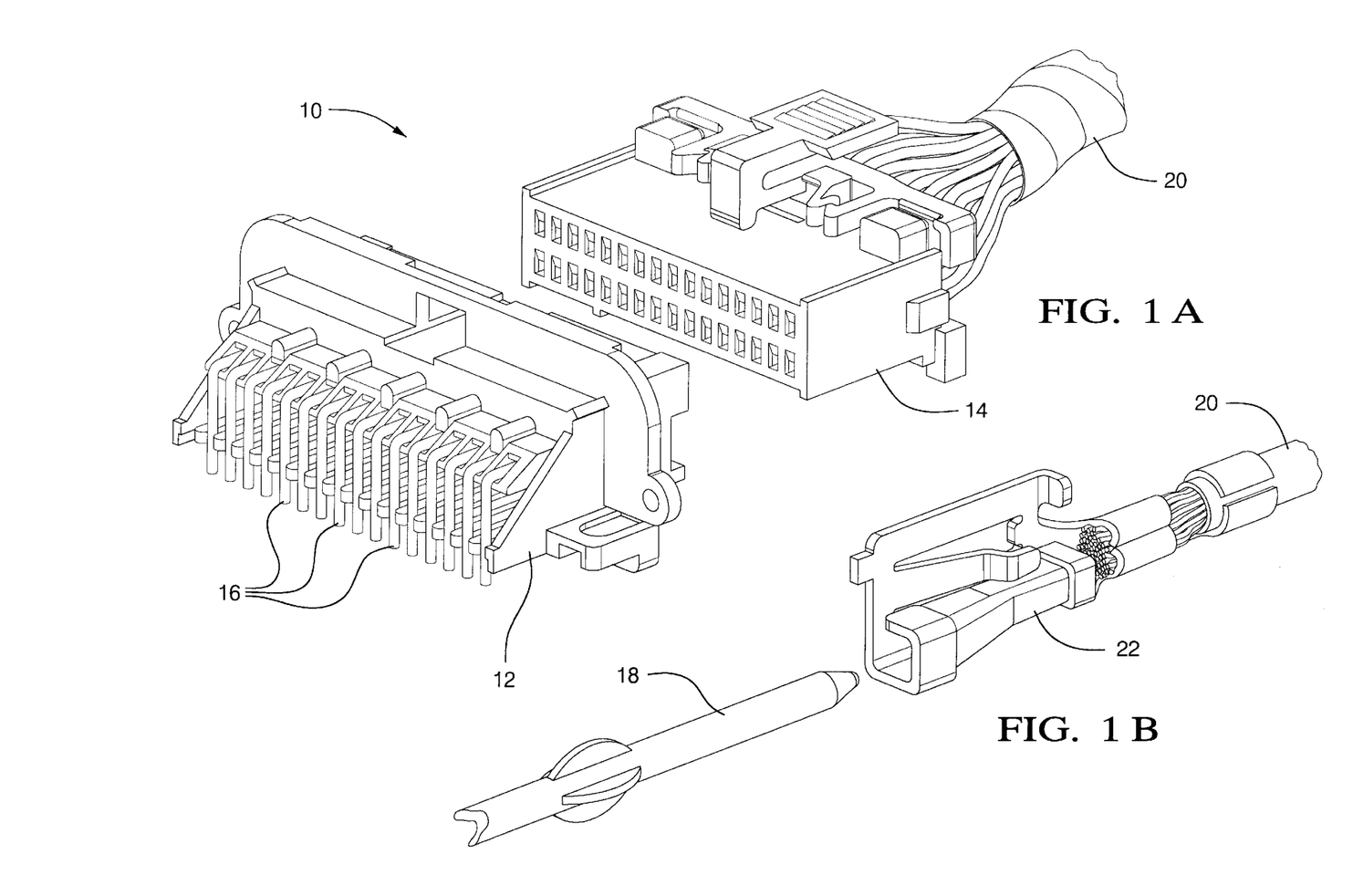
FIG. 1A is a view of a multi-terminal electrical connector carrying a tin plate coating with PTFE microparticles in accordance with the invention.
FIG. 1B illustrates a single male-female terminal pair from the multi-terminal connectors of FIG. 1A.

A typical multi-terminal electrical connector 10 is illustrated in FIG. 1A. A first mateable housing 12 is connectable with a second mateable housing 14. The particular configuration of these housings 12, 14 is not an aspect of this invention. There are electrical insulators and typically molded of plastic. Housing 12 is adapted to receive 32 insulated wires 16 (16 of which are shown) leading to 32 male terminals isolated and embedded in housing 12. A representative male terminal is illustrated at 18 in FIG. 1B. Similarly, housing 14 is adapted to receive a plurality of insulated wires 20 leading to 32 female terminals embedded in housing 14 and isolated from each other therein. A representative female terminal 22 is illustrated in FIG. 1B. The specific designs of male terminal 18 and female terminal 22 are not critical to this invention. The important feature is that they are engaged by pushing them together. They are made of a suitable strong conductive metal such as copper alloy and designed to have a tight pressure fit for maintaining a good electrical connection. When 32 such terminals, for example, are incorporated in a single connector pair 12, 14, the force required to engage and disengage the connection is appreciable.

The purpose of this invention is to provide surfaces on terminal pieces like those depicted at 18 and 22 in FIG. 1B so as to reduce engagement forces over the life of the terminal without unduly increasing the electrical resistance of the connection. The practice of the invention is best illustrated in the SEM photomicrographs that are exhibits 2A through 2E. These photographs illustrate the type of surfaces that are provided on such terminal pieces.

In accordance with this invention, a copper base alloy terminal stock material is provided with an electroplated coating of tin or silver in a suitable coarse grain surface having a nominal grain size in the range of about 1 to 10 micrometers in size. Alternatively, the copper base alloy or other suitable metal alloy may be shaped in the form of a terminal before the tin plating or silver plating is formed. At some point in the manufacture of the terminal, a coating of colloidal PTFE particles is applied to the surface of the tin or silver grained surface. The microscopic PTFE particles are distributed within the crevices of the sliding surfaces. As will be discussed with respect to the photomicrographs of FIGS. 2B–2E, the particles act as miniature ball bearings to significantly decrease sliding friction. Because of the relatively small size of the particles with respect to the surface roughness, the asperity to asperity contacts of the coarse-grained mating surfaces are maintained. Consequently, when the particles are applied to electrical terminals, the electrical contact properties are not adversely affected.

Tin Electroplating Practice

A long C42500 commercial copper alloy strip was prepared as the substrate material in the following embodiment. C42500 alloy has a nominal composition of, by weight, 87 to 90% copper, 1.5 to 3% tin, 0.35% max. phosphorus, 0.05% max. lead, 0.05% max. iron and the balance zinc. It is an alloy commonly used for electrical terminals and connectors. The cleaning and plating of the copper alloy strip was done in a continuous flow process in a standard electroplating line in which the strip was adapted as cathode in the apparatus.

A C42500 strip was first subjected to an electrocleaning operation. It was immersed in and drawn through a 60 to 90 grams per liter commercial aqueous soap solution maintained at a nominal temperature of 125° F. The current density was approximately 200 amps per square foot of cathode surface. The cleaning was continued for a period of a few seconds. The strip then entered a water spray rinse.

The cleaned strip then entered an aqueous solution of fluoboric acid (also called fluoroboric acid, $HBF_4$) to etch the surface of the strip. The bath was formulated to contain 250 grams of fluoboric acid in water per liter of solution. The bath was maintained at a temperature in the range of 70° F. to 95° F. The strip was immersed for a period of a few seconds. The strip then entered a water spray rinse. Thereafter, the strip entered the electroplating cells that used an aqueous bath of fluoboric acid, 200 grams per liter; stannous fluoborate, $Sn(BF_4)_2$, 50 grams per liter and a commercial grain refiner (Fidelity Bath No. 2190) at a temperature in the range of 70° F. to 110° F. The strip was arranged as the cathode in the bath and subjected to a current density of approximately 100 to 200 amps per square foot. Pure tin metal anodes were used. The plating was continued until a plated tin layer about 2.5 microns thick was formed. The strip then exited the plating bath, and was given a water spray rinse and finally a hot water rinse of 135° F. to 155° F.

Figure 2A:
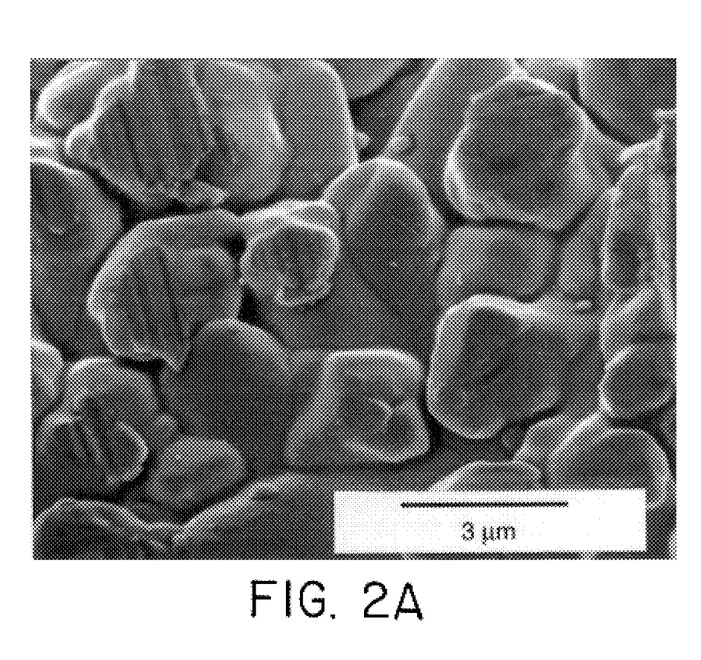
FIG. 2A is an Scanning Electron Micrograph (SEM) of a tin electrocoated layer in accordance with the invention and FIGS. 2B through 2E are photomicrographs of a tin electrocoated layer in accordance with the invention carrying successively increasing amounts of PTFE microparticles.

The strip of electroplated copper alloy had surface grains of substantially pure tin of about three to four microns in diameter. The grains appear to be slightly flattened since their diameter in the SEM photograph is larger than the above-stated thickness of the electroplate. This coarse surface is a matte finish. The structure and composition of the coatings were examined by scanning electron microscopy (SEM) using a Hitachi field emission SEM model S-4000, infrared spectroscopy (IR) in the reflection mode using a Nicolet Infrared Spectrometer Model 550, electron probe microanalysis (EPMA) using a CAMECA Electron Probe Microanalyzer Model SX-100, and x-ray photoelectron spectroscopy (XPS) using a Surface Science instruments Model SSX-101 M-Probe. FIG. 2A is an SEM micrograph of the bare matte coarse tin plated surface.

Thus, the above-specified fluoborate bath provided a coarse tin plate suitable for the practice of this invention. Other tin plating baths can be used provided that the plating process is practiced so as to form coarse grains of tin about 0.5 to 10 micrometers in diameter (or largest dimension in the SEM). Stannate plating baths, stannous sulfate-sulfuric acid baths or tin plating baths based on methanesulfonates may be employed provided the desired coarse grains are obtained.

In the event a silver plate is desired for the connector, a suitable cyanide bath may be used under suitable plating conditions to form coarse silver grains of about 0.5 to 10 microns.

Polytetrafluoroethylene Dispersion Coating

Copper alloy specimens with electroplated tin coatings were cut from the strip into 2.5 cm×2.5 cm pieces. These specimens were hung from copper clips and were subjected to a cleaning cycle that included soaking in MacDermid SuperSoak cleaner for 15 seconds, followed by a thorough rinse in deionized water. They were then electro-cleaned using Benchmark N326E cathodic electro-cleaner operated at 7 volts, followed by another thorough rinse in deionized water.

Dip-Coating in Niflor-E PTFE dispersions

The first three groups of coatings were made by immersing cleaned specimens in separate baths of an acidic Niflor-E PTFE dispersion in deionized water at room temperature with moderate agitation for about five minutes. The three baths consisted of 14.3 ml of Niflor-E dispersion in one liter of deionized water (Sample Group 1a), 4.3 ml/l (1b) and 1.4 ml/l (1c). The fourth group of specimens (1d) was immersed in Niflor-E dispersion whose concentration was about 40 ml/l for about 10 minutes. The Niflor-E PTFE dispersion is an acidic (pH about 3.5 to 4.5) aqueous colloidal dispersion of polytetrafluoroethylene particles (35% by weight) as well as a small amount of a proprietary emulsifier. The nominal particle diameter is about 0.25 microns. Finally, the coated samples were allowed to dry by hanging vertically in still air at room temperature.

Dip-Coating in DuPont PTFE-30 dispersions

Cleaned specimens of copper alloy with electroplated tin, 2.5 cm×2.5 cm in size, were immersed in a mixture of DuPont PTFE-30 and deionized water at room temperature with moderate agitation for approximately one second. The mixture consisted of 20 ml of DuPont PTFE-30 in one liter of deionized water (Sample Group 2a). DuPont PTFE-30 is a colloidal dispersion of spherical particles of PTFE, approximately 0.22 $\mu$m in diameter and 60% by weight. The PTFE particles are evenly dispersed in an alkaline solution of pH 9 to 10 which contains small amounts of nonoxynol serving as a wetting agent, polymer antioxidant, dispersant, stabilizer and demulsifier. The addition of small quantities of ammonium perfluorooctanoate serves as an anti-fungicide. The drying procedure was the same as above.

Coated Connectors

Finally, individual male and female terminals like the individual terminals (18, 22) shown in FIG. 1B were dip-coated according to the following conditions:

Group 3a: Standard soak clean, electro-clean cycle followed by immersion in DuPont PTFE-30 for one second @ 10 ml/l.

Group 3b: Immersion directly in DuPont PTFE-30 for one second @ 10 ml/l without pre-cleaning cycle.

Group 3c: Standard soak clean, electro-clean cycle followed by immersion in Niflor-E for one second @ 14 ml/l.

Group 3d: Immersion directly in Niflor-E for one second @ 14 ml/l without pre-cleaning cycle.

The cleaning cycle for reflowed samples (150GT) only include 30 seconds in McDermid SuperSoak.

Characterization of the Coatings

Figure 2B:
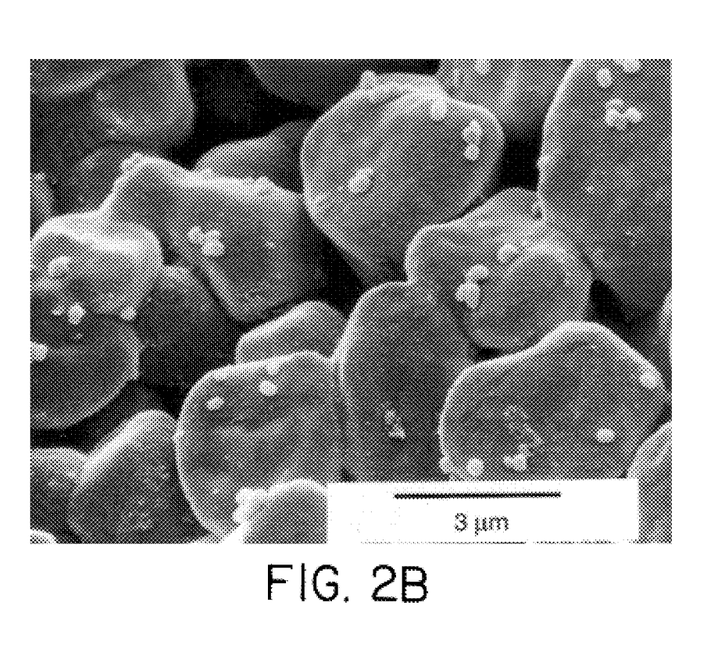
Figure 2C:
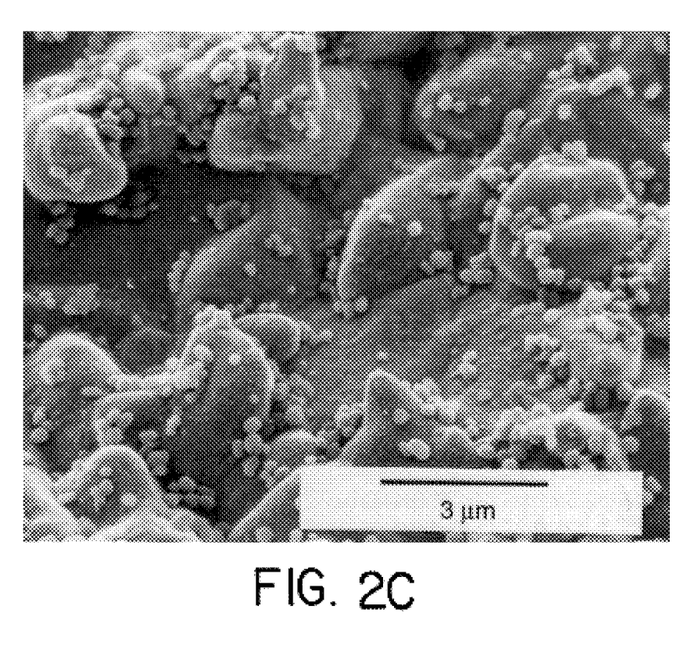
Figure 2D:
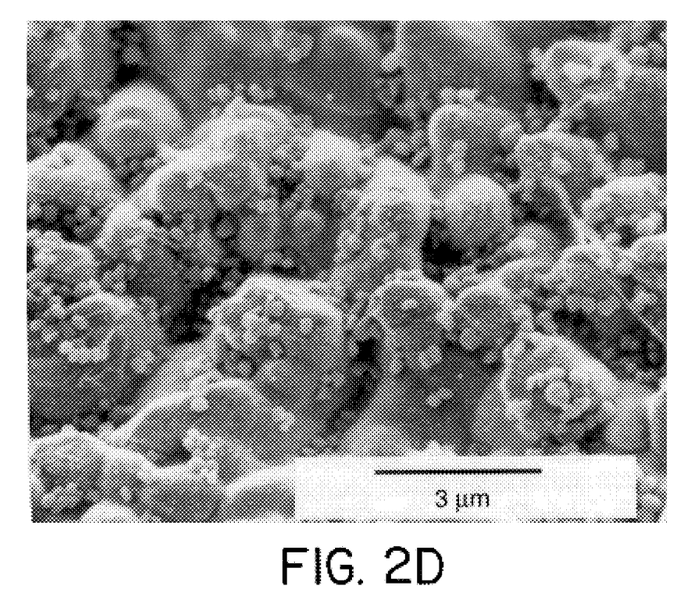
Figure 2E:
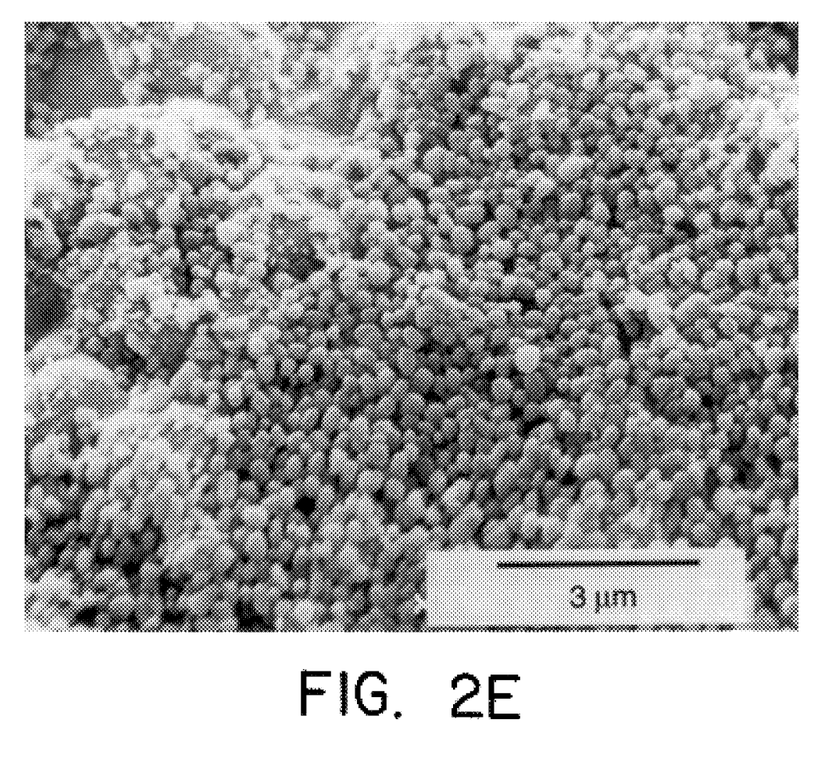

The density and location of the PTFE particles in the coatings were examined by scanning electron microscopy (SEM) using a Hitachi field emission SEM model S4000. The SEM observation showed that spherical particles of PTFE of about 0.2 micrometer diameter were deposited on the surface of the matte-tin after immersion in Niflor-E dispersion. FIG. 2B is an SEM micrograph of the matte-tin after immersion in 1.4 ml of Niflor-E in 1.0 liters of deionized water (1.4 ml/l). FIG. 2C is an SEM micrograph of the matte-tin after immersion in 4.3 ml Niflor-E/liter of deionized water. FIG. 2D is an SEM micrograph of the matte-tin after immersion in 14.3 ml Niflor-E/liter. FIG. 2E is a micrograph of a matte-tin specimen coated with about 40 ml Niflor-E/liter.

For a given immersion time, the number of particles increases with increasing concentration of the PTFE particles in the aqueous dispersion ranging from partial coverage of the matte-tin surfaces (see FIG. 2B) to complete coverage of the matte-tin surfaces (see respectively FIGS. 2C, 2D and 2E). In cases of partial coverage, more PTFE particles are found in the crevices or grooves of the rough surface of the matte-tin electroplate. Furthermore, the particles remain in these crevices and grooves after treating the coated surfaces with flowing air or rubbing with hand or wiping with Kemwipes and after application and removal of scotch tapes. It was conclusively determined that the rough tin surface is better than a smooth tin surface in retaining the particles. In general, a suitable areal loading density of PTFE particles for both good lubricity and low contact resistances is in a range from about 0.02 gram PTFE/$m^2$ to 0.4 gram/$m^2$ of geometric surface area.

Friction Measurements

The friction coefficient was measured by a pin-on-disk method using an Implant Sciences Corporation ISC-200 Tribometer. Measurements were made on the matte-tin without the PTFE particles and on samples coated in different concentrations of PTFE dispersion as described above. In each case, the pins and disks were the same materials. The pin was a piece of the material with a 3 mm radius dimple and was mounted on a holder specially designed for pin-on-disk measurements. All measurements were carried out at room temperature (21° C.) with 1 N normal force. The rotation speed of the disk was 10 rpm, radii 3.5 to 6.0 mm, and running distance 1.6 m. The results were plotted as coefficient of friction vs. sliding distance.

Contact Resistance Measurements

The contact resistance of the specimens was measured with a probe per ASTM B667. Measurements were made on the matte-tin before coating and on samples coated in different concentrations of PTFE dispersion as described above. A solid gold rod with a 1.6 mm hemispherical radius was 15 used for the probe tip with measurements carried out at 0.5, 1.2 and 5 N contact force. For each force, measurements were made over ten different spots. The contact resistance measurements were made under dry circuit conditions to prevent electrical breakdown of insulating films.

Terminal to Terminal Engage/Disengage Force Measurements

The female terminals were engaged to male terminals at a rate of 50 mm/min using ES-T-926 as a guideline. The engage force was applied along the approximate center line of each female terminal and the force was recorded as a function of sliding distance. Immediately following engage, the female terminals were disengaged from the male terminals at a rate of 50 mm/min using ES-T-926 as a guideline. The disengage force was applied along the approximate center line of each female terminal and the force was recorded as a function of sliding distance. The tests were conducted at room temperature. Three engage/disengage tests were performed for each sample group.

Friction

Figure 3:
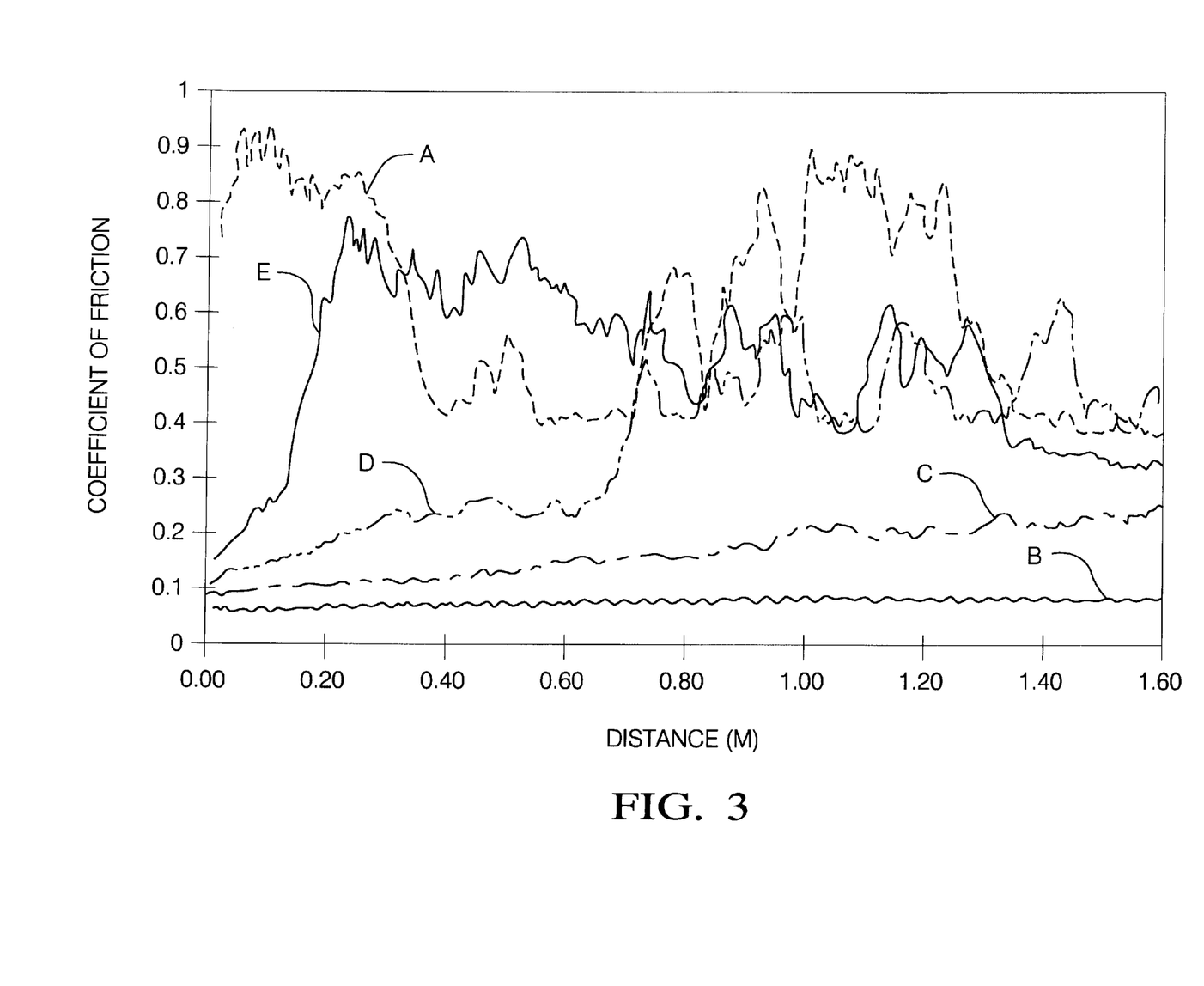
FIG. 3 is a graph of coefficient of friction vs. sliding distance by a pin on disk method comparing uncoated matte tin (curve A), matte tin after immersion in baths with different amounts of Niflor-E dispersion per one liter of de-ionized water (ml/l), about 40 ml/l (curve B), 14.3 ml/l (curve C), 4.3 ml/l (curve D) and 1.4 ml/l (curve E).
Figure 4A:
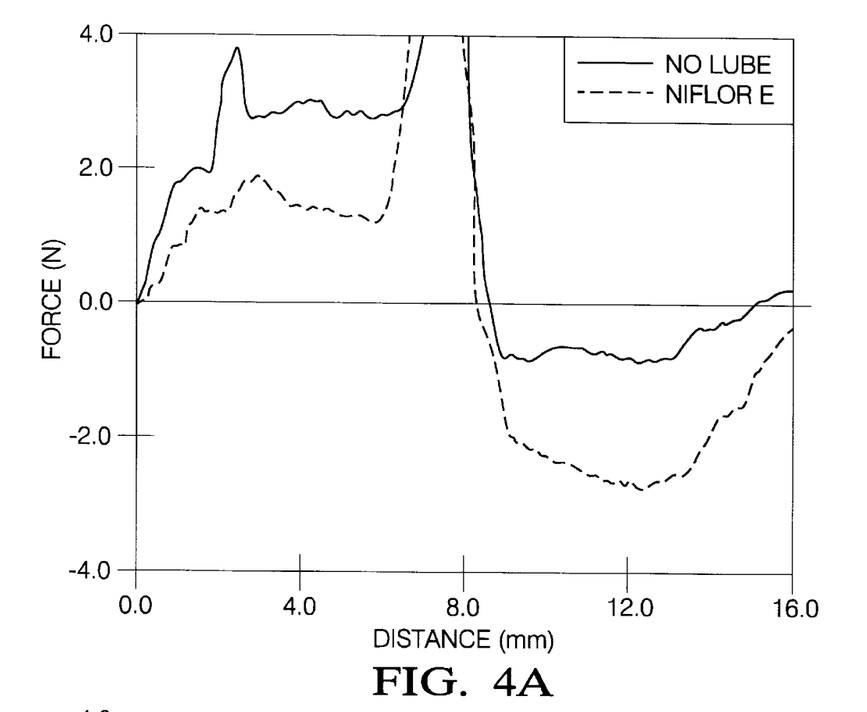
FIGS. 4A through 4D are graphs of engage/disengage forces in Newtons, N, versus distance, in millimeters, for male-female terminals with and without PTFE coatings. Graphs 4A–4D correspond to the respective preparation conditions 3a–3d described in the specification below. Each force vs. distance curve is an average of three measurements.
Figure 4B:
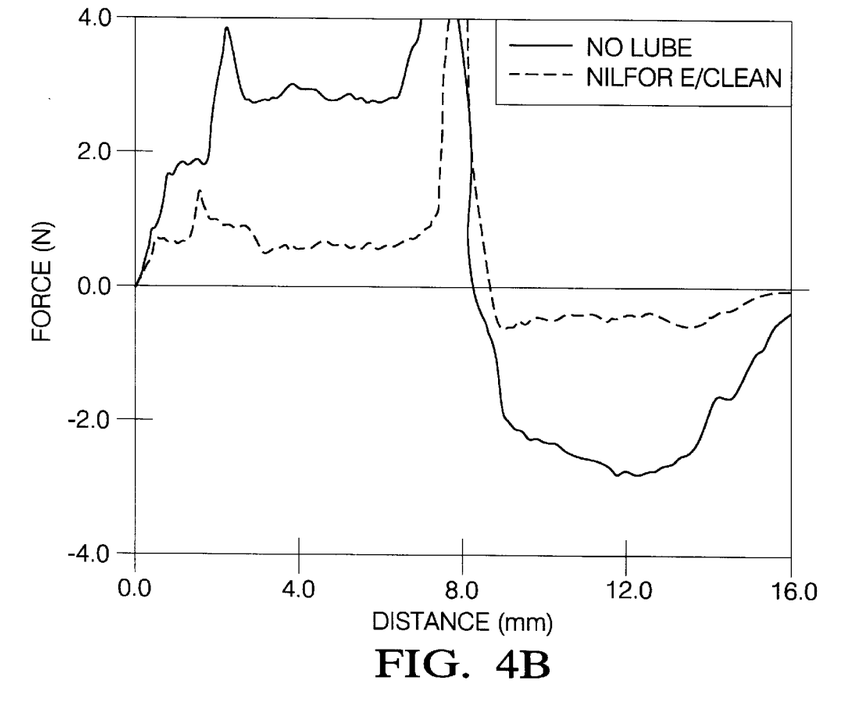
Figure 4C:
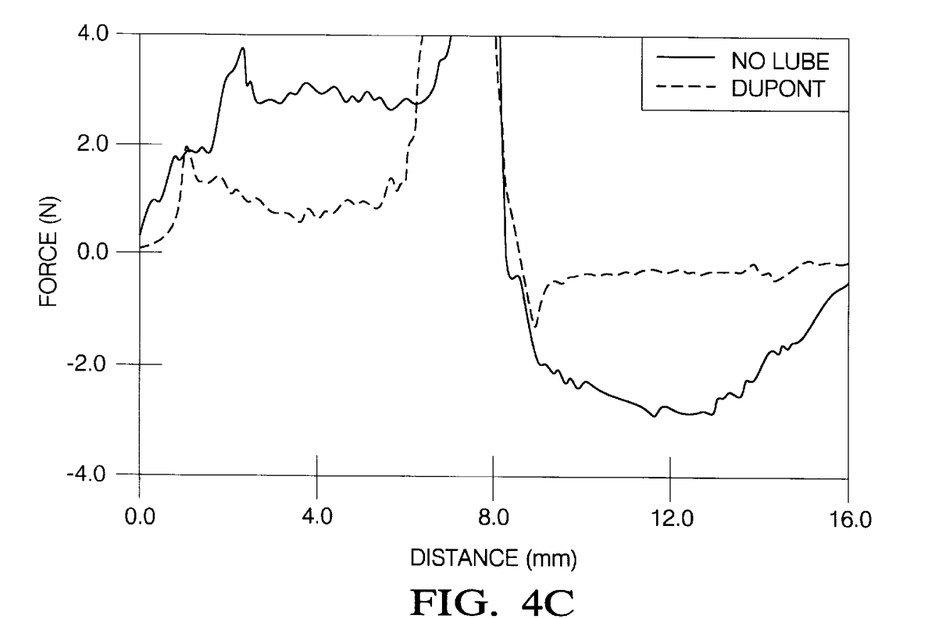
Figure 4D:
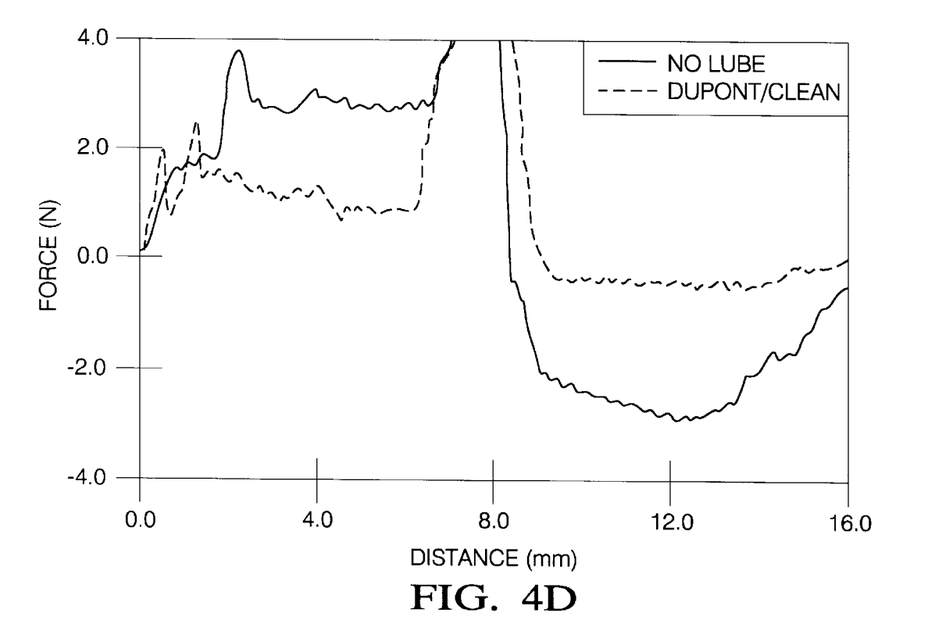

The friction coefficient as a function of sliding distance obtained from pin-on-disk experiments are summarized in FIG. 3. The friction coefficient for the matte-tin without PTFE particles, Curve A, lies between 5 0.4 and 0.9 with large fluctuations. The friction coefficient decreases with increasing number of PTFE particles deposited on the matte-tin surface as seen in Curves B–E. The lowest friction coefficient achieved was about 0.08 (Curve B) for the sample completely covered with PTFE particles (about 40 milliliters of Niflor-E per liter of bath, FIG. 2E). Curves C, D and E show the friction data, respectively, for PTFE coatings produced from 14.3 ml Niflor-E/liter of bath, 4.3 ml Niflor-E/l and 1.4 ml/l. The sliding distance at which a significant increase in friction coefficient is experienced increases with more PTFE particles per mm$^2$ on the matte-tin surfaces. These results clearly show that the friction coefficient can be significantly lower than matte-tin by depositing PTFE particles on tin surfaces. The durability of the PTFE coating can be adjusted by the number of PTFE particles deposited. Of course, the determination of a suitable PTFE loading for friction reduction will depend greatly on the design of the terminals.

Contact Resistance

The electrical contact resistance as a function of normal load for various coatings is given in Table 1. The results show that the contact resistance decreases with increasing normal load for all specimens. The presence of PTFE particles on tin surfaces has little effect on contact resistance at high normal loads. At low loads, however, the contact resistance of matte-tin completely coated with PTFE particles is much higher than that of bare matte-tin and that with a small number of PTFE particles. The low contact resistance at high loads is the result of several processes, including the movement of PTFE particles from the contact spots to crevices or the deformation of PTFE particles and the tin layer. The latter process may result in the forming of a composite consisting of PTFE particles in the continuous in matrix under load. The contact resistance should remain low as long as he volume fraction of tin is above the percolation threshold, allowing the conduction of electrical current.

TABLE 1

| | LOAD (N) | | | |
| --- | --- | --- | --- | --- |
| | 0.5 | 1 | 2 | 5 |
| Material | $R_m \pm \sigma(m\Omega)$ | $R_m \pm \sigma(m\Omega)$ | $R_m \pm \sigma(m\Omega)$ | $R_m \pm \sigma(m\Omega)$ |
| Matte-Tin | 1.25 ± 0.13 | 0.77 ± 0.05 | 0.52 ± 0.06 | 0.35 ± 0.01 |
| 1c Niflor 1.4 ml/l | 2.48 ± 1.26 | 1.32 ± 0.42 | 0.71 ± 0.12 | 0.33 ± 0.04 |
| 1b Niflor 4.3 ml/l | 2.68 ± 0.94 | 1.27 ± 0.21 | 0.71 ± 0.08 | 0.37 ± 0.03 |
| 1a Niflor 14.3 ml/l | 5.11 ± 3.07 | 2.92 ± 1.80 | 1.51 ± 0.87 | 0.54 ± 0.18 |
| 1d Niflor 40 ml/l | 19.49 ± 37.96 | 7.35 ± 15.38 | 1.35 ± 0.77 | 0.57 ± 0.08 |
| 2a DuPont 30 ml/l | 12.43 ± 7.44 | 5.77 ± 2.70 | 2.16 ± 0.67 | 0.87 ± 0.29 |

Engage and Disengage Forces

FIGS. 4A through 4D illustrate the effects of PTFE particles on the engage and disengage forces for electrical terminals electroplated with matte-tin. For the terminals a force peak, $F_p$, was usually observed at a distance of about 2 mm during engaging the terminals. This peak force is needed to align the male and female terminals. A second force peak is typically observed at a distance beyond 6.5 mm during engaging, which is caused by the female terminal "bottoming out" on the male terminal. Between the two force peaks, a nearly constant force, $F_e$, is needed to overcome friction for engaging the terminals. When the terminals are disengaged, a nearly constant force, $F_d$, is needed to overcome friction. The values for forces $F_p$, $F_e$ and $F_d$ provide a measure for the effectiveness of the PTFE coatings.

FIGS. 4A–4D clearly show that PTFE particles on a suitable tin plate can significantly reduce the engage and disengage force for both 150 Metri-Pack and 150GT electrical terminals. The percentage decrease in $F_p$, defined as $100 \times (F_p - F_p^{PTFE})/F_p$, is between 30% and 50%. The percentage decrease in $F_e$ and $F_d$ is greater than 50%. PTFE particles are, therefore, very effective in reducing engaging and disengaging forces.

It is clear that a compromise must be obtained in determining the amount of PFTE microparticles or other suitable lubricating microparticles to apply to the coarse grained silver or tin electroformed coating in a specific electric terminal application. The density or loading of the particles must be high enough to provide the desired lubricity without making the electrical resistance too high at the contact load. As a general practice it is preferred that the contact resistance be no greater than about five milliohms at the specified contact load.

The invention has been illustrated in the embodiment where the tin or silver plate is formed on a representative copper alloy. However, it is apparent that a wide range of terminal substrates can be used to carry the polymer microparticle coated tin or silver matte electroplate. Low carbon steels are used in electric terminals as are other metal alloys. Even plastic terminal substrates can be employed, especially when the tin or silver electroformed coating can carry the intended electric current.

Accordingly, while this invention has been described in terms of some specific embodiments, it will be appreciated that other forms can readily be adapted by one skilled in the art. Accordingly, the scope of this invention is to be considered limited only by the following claims.

What is claimed is:

1. An electrical contact having an electroplated coating of tin or silver with a surface characterized by electroformed grains having an average size in the range of 0.5 to 10 micrometers, and particles of a low friction electrically-insulative polymer up to about 0.30 micrometers in average diameters deposited on said grains.

2. An electrical contact as recited in claim 1 in which the electroplated coating is tin and the polymeric particles are polytetrafluoroethylene.

3. An electrical contact as recited in claim 1 in which the electroplated coating is silver and the polymeric particles are particles of polytetrafluoroethylene.

4. An electrical contact as recited in any of claims 1 through 3 in which the electroplated coating and the polymeric particles are formed on a substrate selected from the group consisting of copper base alloys and low carbon steel alloys.

5. An electrical contact as recited in claim 1 in which said electroplated coating and polymeric particles are formed on a thermoplastic substrate.

6. An electrical contact as recited in claim 1 in which the quantity of said particles is such that the electrical contact resistance of said terminal at its contact load with a mating terminal is no greater than five milliohms.

7. An electrical contact as recited in claim 1 in which the geometric area loading of said particles on said surface is in the range of about 0.02 gram/$m^2$ to 0.4 gram/$^2$.

8. A method of making an electrical terminal with a contact surface for low friction engagement and low contact resistance with another electrical terminal, said method comprising electrodepositing tin or silver on said surface in the form of grains having an average size in the range of about 0.5 to 10 micrometers, and depositing particles of a low friction, electrically-insulative polymer on said surface by immersing the surface in an aqueous suspension of the low friction particles, said particles having an average size of up to about 0.30 micrometers.

9. A method as recited in claim 8 in which said polymer is polytetrafluoroethylene.

10. A method as recited in either claim 8 or 9 in which the quantity of said particles deposited on the electrodeposited tin or silver surface is controlled so that the electrical contact resistance of said terminal at its contact load with a mating terminal is no greater than five milliohms.

11. A method as recited in claim 8 in which the quantity of said particles deposited on the electrodeposited tin or silver surface is controlled so that the geometric area loading of said particles on said surface is in the range of about 0.02 gram of particles per square meter of surface to about 0.4 gram of particles per square meter of surface.

* * * * *